Dec. 25, 1962    D. FLEISCHER ETAL    3,070,308
HANDICAP COMPUTER
Filed July 21, 1958
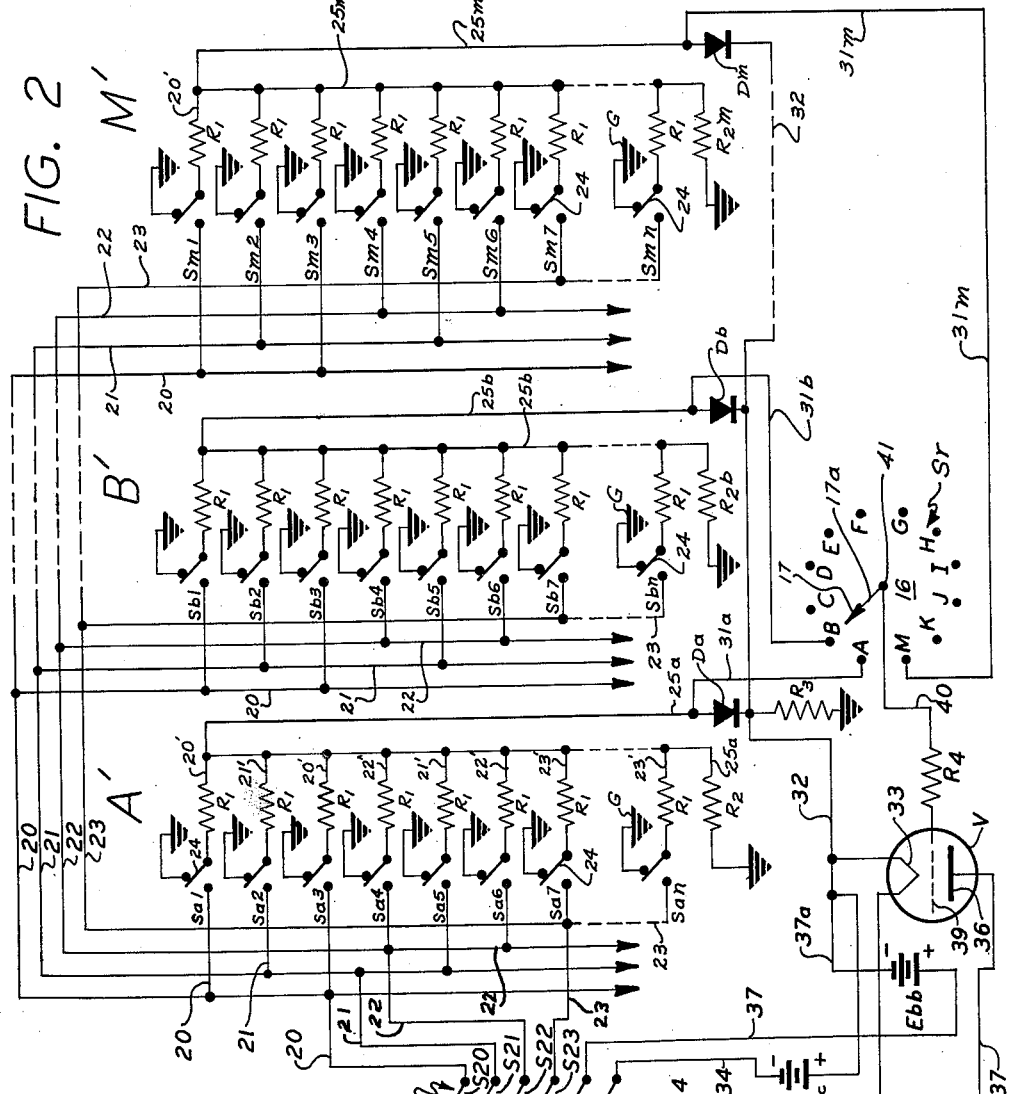
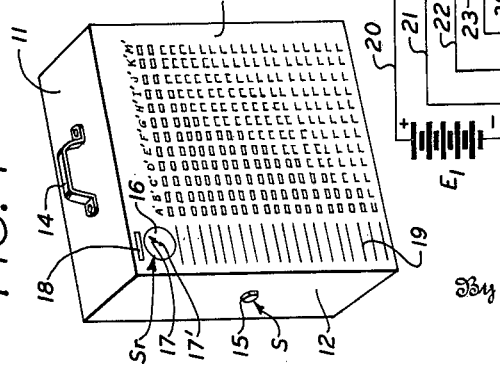
Inventors
DAVID FLEISCHER,
JAMES A. LIEBESKIND.
By George R. Bliss
Attorney United States Patent Office 3,070,308
Patented Dec. 25, 1962

3,070,308
HANDICAP COMPUTER
David Fleischer, 7253 Hollywood Blvd., Hollywood, Calif., and James A. Liebeskind, Inglewood, Calif. (16342 Kalisher St., Granada Hills, Calif.)
Filed July 21, 1958, Ser. No. 749,931
5 Claims. (Cl. 235—193)

This invention relates to computers which automatically add the several weighted values of characteristics and the like in a set of categories, the characteristics in each category being differentially weighted according to their respective categories, the characteristics being those of a plurality of individual entities of similar nature, and being assumed to be contributory to a resultant condition or event, the computers being constructed to indicate the relative standing of the entities according to the corresponding sums of such values, respectively.

The invention has many applications. It is shown and described herein as applied to the determination of the probable results of a horse race based on the factors which are deemed to enter into the nature of the performance of racing horses. Among other applications may be mentioned such problems as the determination of a material most suitable for a given purpose based on the qualities or characteristics deemed contributory to the fulfilment of that purpose. The principle may also be used in the determination of the most suitable of a number of candidates for the handling of a given work assignment, based on the factors, such as past performance, mental ability, traits of character, and training.

It is the object of the invention to provide a computer especially adapted to give answers to problems of the character above set forth, and to do so accurately to the extent of the reliability of the data with which it is supplied. It is another object of the invention to provide such a computer which shall be compact, relatively inexpensive to manufacture, easy to operate, of attractive appearance, of light weight and small size. In the form set forth herein, it is an object of the invention to provide spectators of horse races with a convenient, easily and quickly operated instrument for determination of the probable winners of horse races, usable at the race track, and available for handling information pertinent to a race whether that information came to the knowledge of the spectator at an earlier time or immediately preceding the race. Its automatic character and the rapidity with which it can be operated eliminates the effort on the part of a spectator, of lengthy computations, and eliminates much of the subjective thinking and guesswork in selecting the winners of a race.

In the drawings which are for illustrative purposes only:

FIGURE 1 is a perspective view of a computer embodying the invention.

FIGURE 2 is a diagram of the electrical apparatus of the computer.

The computer in its preferred form shown in FIGURE 1, is of generally rectangular shape with a top wall 11, side walls, of which one is shown at 12, and a front wall 13. The back wall (not shown) is removable for access to the electrical devices and circuitry within the case. The bottom wall (not shown) is permanently secured to the case, and designed to engage a floor and support the case thereon when the computer is in standing position as shown in the drawing. For operation, the case may be placed in the lap of the race spectator, with its front wall 13, uppermost and with the top wall 11 over his knees.

The top wall 11 is provided with a suitable handle 14 for manually carrying the computer. The side wall 12 has an opening 15, through which projects the finger grip of an On-Off master gangswitch S which is arranged as will later appear, to connect the several direct current dry batteries by which the computer is energized, to their several circuits.

Behind an opening in the upper left corner of the front wall 13 is mounted a dial switch Sr of which the face 16 appears in the drawing. The face 16 carries designating letters A to M inclusive, each letter representing one of the several horses entered in a race. An arrow pointer 17 may be manually rotated by a knob 17' at the base of the arrow, to direct it toward any one of the letters A to M. A switch arm 17a (shown only on FIGURE 2) lies directly beneath the arrow 17 and is mounted to be operated by the knob 17' in unison with the arrow. The switch arm makes contacts successively with contact points designated A to M inclusive (see FIGURE 2), which are located directly beneath the letters A to M on the dial, in a manner to be later explained. The number of lettered contact points provided on a computer will vary according to the circumstances and conditions of its use. Twelve points are shown on the drawing, since the number of entries on American horse racing tracks is customarily limited to twelve.

Just above the dial switch Sr is placed a window 18 just in front of an illuminable voltage indicator electronic tube V (shown on FIGURE 2) which glows when the arrow 17 points toward the designating letter of the horse having the greatest handicap strength, according to the data given to the computer, of all the horses whose modes of handicap circuits are at that instant electrically connected to the energizing current source of the computer. By way of example only, tube V may be a type 6977 filamentary, high-vacuum indicator triode with a fluorescent anode as manufactured by Amperex Electronic Corporation.

We shall use the term "mode" herein to designate the summing network and inhibitor gate circuitry specific to the handicap features of one horse only; we shall use the word "handicap" in the sense of either an advantageous or disadvantageous condition or characteristic affecting the capability of a horse winning a race, and whether natural or artificially imposed. A computer of the character of this invention may be designed to take care of both favorable and unfavorable handicaps. Because, however, of the circuitry complexity and other difficulties of providing for unfavorable handicaps, the embodiment of the invention shown herein is designed to handle only categories of favorable handicaps. Since there is a favorable handicap positively expressed for every unfavorable handicap negatively expressed, and since it would be difficult to design and expensive to construct a computer to operate properly unless all favorable or all unfavorable handicaps were provided to be fed to the computer, the computer described herein is designed to handle only positively stated favorable handicaps. Thus if "over 4 years old" can be considered as a favorable handicap, and "under 4 years old," an unfavorable handicap, it is obvious that by supplying the computer positively with the favorable "over 4 year old data" for those horses which are of such age, and not supplying the computer with the unfavorable "under four year old" data for all the other horses which are under four years old, the computer is in as good condition to properly rate the horses as to age handicap, as if it were designed to handle both positive and negative age data.

As will appear in an explanation of the diagram shown in FIGURE 2, each lettered contact point behind the dial face 16 is connected to a corresponding mode A', B', C' to M' of circuits by which is created a voltage differential representing the net advantageous handicap of the horse designated by the letter which identifies that point. The circuit of each mode A' to M' inclusive has a set of switches, each set of these twelve sets being arranged in vertical column on the outer face of the front wall 13 of the computer case.

In the set of switches of each mode there are as many switches as there are categories of advantageous handicap conditions or characteristics which are predetermined as affecting the probability of a winning performance of a race horse. For example twenty such switches for twenty such categories of conditions and characteristics are shown in the drawing in each of these vertical columns of switches. The category switches in mode A' are designated as $Sa1$, $Sa2$, $Sa3$, etc. to $San$ (letting $n$ represent the highest numbered handicap characteristic) the category switches in mode B' as $Sb1$, $Sb2$, $Sb3$, etc. to $Sbn$. (See FIGURE 2.) For clarity these designating numerals and letters do not appear on FIG. 1, each column being designated at its top as A', B', C', etc. to M'. The manually movable part of these two hundred and forty switches project through the front wall 13 of the case where they are readily operable. To the left of mode A' switches appears a column 19 of legends, each one of which describes the handicap category of the twelve switches in a horizontal row to the right of the column 19.

Turning now to FIGURE 2 of the drawing, at the left side of the figure are shown four direct current dry batteries E1, E2, E3 and E4. These batteries have different voltage outputs, as for example of 45, 90, 135, and 180. These different voltages may have other values without departing from the principle of the invention. The differences in the voltages must, however, answer to one requirement. The voltage of each battery is proportional, respectively, to the weighted value given to all the categories of one group of equally weighted categories of favorable handicap conditions or characteristics which is predetermined to be the degree of influence of the categories of that group on the capability of a horse to make a successful race.

Thus, for example, if a first group which we will refer to as G-1 categories, as for example categories in the first, third, ninth, thirteenth, fifteenth and seventeenth horizontal rows on the front panel 13 of the case, which we will refer to as categories $c-1$, $c-3$, $c-9$, $c-13$, $c-15$ and $c-17$, if these categories are assumed from an analytical and cut-and-try-study to have a given and equal influence of a first value or weight, which we will refer to as W-1, on the racing performance of race horses, battery E1 will be connected to all six of these numbered category switches in each mode of circuits, one mode for each horse, 72 switches in all. If categories $c-2$, $c-5$, $c-10$, $c-16$ and $c-19$ which we will refer to as a second group G-2 of categories, are assumed from such a study to have another given and equal degree of influence of a second value or weight W-2 on the racing performance of race horses, which we will also assume, for example, to be twice the value of W-1 which was assigned to the first group G-1 of categories, then battery E2 which is connected to the category switches of this second group G-2 of all the modes, will have twice the voltage output of battery E1. Batteries E3 and E4 are similarly connected to the category switches of the twelve modes of circuits, and in the purely illustrative set-up herein drawn and described, are connected to category switches as follows: E3 to switches of all categories having a weight W-3 which is three times the weight W-1 of the categories of the first group G-1, and E4 to all switches of categories having a weight W-4 which is four times the weight W-1 of the categories of the first group C-1.

The battery E1 is connected at its positive terminal by a network of conductors 20 to all of the category switches of the categories in Category Group G-1 in each of the modes A' to M' inclusive. Battery E2 is similarly connected to the category switches of Category Group G-2 by a conductor network 21. Batteries E3 and E4 are similarly connected to the category switches of Category Group G-3 and G-4, respectively, by conductor networks 22, and 23, respectively. Each of these four conductor networks is controlled by an associated switch element S20, S21, S22, and S23, respectively, in the On-and-Off master gang switch S.

Considering the summing network circuitry of mode A' which is identically similar to the circuitries of the other modes B' to M' inclusive, each category switch $Sa1$ etc., is a single-pole, double-throw switch of which the movable arm 24 is movable between an on position in which it connects the conductor 20, or 21, or 22, or 23, as the case may be, through a conductor 20' or 21', 22' or 23', as the case may be, and resistor R1 to a conductor 25a, and an off position in which it is grounded at G. The switch is so constructed that it is held stationary at either one of these two positions, and is incapable of remaining stationary at any intermediate position. The resistors designated R1 in the circuitry of each category switch are all of the same value.

Conductor 25a at one end of its multiple connections to the resistors R1 leads through a resistor R2 to ground. 100K ohms and 200K ohms may be taken as exemplary values of resistors R1 and R2 respectively. At the other end of its multiple connections it is connected to the anode of a crystal diode $Da$.

The cathode of this crystal diode $Da$ is connected in multiple by a conductor 32 to the cathodes of the crystal diodes of the other modes, $Db$ etc., to $Dm$. The conductor 32 is connected to the cathode 33 of the voltage indicator tube V. It is also connected to ground through a resistor of very high ohmage, R3; this circuit arrangement comprises an inhibitor gate. The cathode 33 is also the tube heater, the heater voltage being supplied by a battery $Ecc$. Circuit 34, which is in the heater circuit is closed by a switch element 35 in the master gang switch S.

The plate 36 of the tube V is connected to the positive terminal of a battery $Ebb$ of, for example 30 volts, by a conductor 37, upon the closing of switch element 38 of the master switch S. The negative terminal of this battery is connected to cathode 33 by a conductor 37a.

The grid 39 of the tube V is connected through a protective resistor R4 by conductor 40 to the central common terminal 41 of the switch arm 17a of the dial switch $Sr$. The outer end of this switch arm 17a makes contact successively as it is manually rotated, with contact points A, B, C, etc. to M. Each of these contact points A to M are connected by conductors 31a to 31m respectively to the anodes of diodes $Da$ to $Dl$ respectively. Each of these dioes is similar to all the other diodes both as to construction and the electrical values of its parts; by way of example only, a type 1N100 general purpose computer diode may be employed.

The plate 36 of the voltage indicator tube V is specially treated to cause it to glow when current flows from the cathode 33 of the tube V to the plate, which, of course, happens whenever the grid 39 of tube V is not negatively biased.

In the operation of the computer, with all of the two hundred and forty category switches $Sa1$ to $San$, $Sb1$ to $Sbn$, etc. to $Sm1$ to $Smn$, in open position, first the handicap category switches of the modes A' to M' are closed in all of the modes associated with the horses entered in a race. It will be understood that if only five horses are entered, then the category switches in only five modes will be closed, usually for convenience the modes A' to E' inclusive. The switches of the applicable categories of each of the circuit modes A' to E' will be closed. For example if switch S1 for category $c-1$ of the twenty categories $c-1$ to $c-20$ is "four years or older," then the switches in each of the five modes A' to E' representing the five horses entered in the race respectively, which are four years old, or older, will be closed. Assume there are three such horses A, D, and E. Then closing category switches $Sa1$, $Sd1$, and $Se1$, will prepare the machine to apply a voltage of 45 volts through conductor system 20 to each of the conductors 25a, 25d and 25e in each of the three modes A', D', and E'. The applicable switches of each category c–1 to c–20 in each of the modes A' to E' respectively will be similarly closed.

After the operative step of closing the applicable category switches is completed, the master on-and-off switch S is closed. The four batteries E1, E2, E3, and E4 are thereby connected to the category circuits 20, 21, 22 and 23 by switch elements S20, S21, S22, and S23 of the master switch S. Switch elements 35 and 38 of the master switch S, are also closed with the closing of switch S, (1) energizing the heater circuit of the tube V by connecting it to the battery Ecc, and (2) connecting the terminals of the battery Ebb to the cathode and anode terminals of the tube V, which causes a flow of current from cathode 33 to plate anode terminal 36, when the grid 39 of the tube V is not negatively biased.

By closing master switch S, each conductor of those designated 25a, 25b, etc. to 25m, in the several modes respectively will have applied thereto a voltage equal to the sum of the voltages applied to the category switches of that mode by the batteries E1, E2, E3, and E4. As described above, each battery is connected to a conductor system 20, 21, 22, and 23 respectively, each of which system is connected to all of the category switches of all the modes, of which switches the categories are all of the same weight W1, W2, W3, or W4 as the case may be. The circuits of each mode from the conductor systems 20, 21, 22, and 23, to the conductor 25a or 25b, or 25c up to conductor 25m as the case may be, are what are known as summing networks. The arms 24 of the category switches are all individually grounded when in the open position. The conductors 25a, 25b, etc. of each mode are therefore grounded through one of the resistors R1 at each open category switch and also through a resistor R2. In this type of circuit, the voltage applied at the closed category switches of any one mode, are summed and caused to impress upon the conductor 25 of that mode a voltage which is proportional to the sum of the category voltages. These summed voltages are of different values in the several modes, according to the handicap characteristics o fthe horses corresponding to the several modes. They represent the probability of each horse winning a race in which the other horses particplate. The reliability of this probability is, of course, dependent upon the accuracy of the appraisal of the handicap characteristics of each hose and of the determination of the weight of each handicap characteristic, and also of course, is subject to accidents and the unforeseen fau!ty performance of horse or jockey or other unforeseen or overlooked event.

After the category switches are manipulated as just described the voltages in the conductors 25 leading to the anodes of the diodes Da, Db, etc., are indicative of the relative probability of horses A to E (in the hypothetical case assumed above) winning a race. We will assume that conductor 25b leading to the anode of diode Db has the highest voltage. The circuitry comprising the inhibitor gate may be made to reveal this condition in the following manner.

The switch arm 17a of the switch Sr is rotatably moved by means of the knob 17' until the arrow pointer 17 points to A. Tube V will not conduct current from cathode 33 to plate 26 because, as we shall presently see, the grid 39 is negatively biased. The same result is true when the switch arrow 17 points to contacts C, D, or E. (We have assumed that only five horses are racing and that the category switches of the other modes were not set.) But if we turn switch Sr to the B position, the grid 39 will not be negatively biased and current will flow from cathode to plate anode of the tube V, causing the plate to glow. Its illumination will be visible through the window 18 and will indicate to the operator that horse B is most likely to win the race.

This result-indicating operation of the tube V, i.e. its glowing only when its grid is connected to the conductor 25 having the highest potential, is explained as follows. The diodes Da to Dm inclusive are all connected in parallel by the conductor 32. The highest voltage of the voltages on conductors 25a to 25m which we will assume to be 25b will cause the diode to which it is connected, i.e. Db, to pass current from its anode to its cathode. Since the resistance of such a diode to current passing from anode to cathode is negligibly small compared to that of the resistor R3, the voltage drop of the current is negligible and this highest voltage will appear also on the conductor 32 connecting in multiple the cathodes of the diodes. The resistor R3 which is one of a very heavy ohmage, is a circuit protector and may be omitted from the circuit without affecting the operation of the machine. Since all the other diodes have impressed upon their anodes by conductors 25a, 25c etc. a lower voltage than that of 25b, the voltage applied to their cathodes from conductor 32 will be higher than the voltages on their anodes and they will be backbiased, thus establishing the inhibited condition of the gate and no current will flow from anode to cathode.

In the case of diode Db, there will be substantially no voltage drop from cathode to anode thereof. In the case of all the other diodes, which are backbiased there will be a substantial voltage drop from cathode to anode. Then by placing the switch Sr in the position of contact with the contact point B the grid 39 will have a zero bias and current from battery Ebb will flow from cathode 33 to plate 36 of tube V and the plate will glow which will be visible through window 18. And by placing the switch Sr in position of contact with any other of the contact points A to M, the grid 39 will have a negative bias and no current will flow from battery Ebb through the tube V, and the tube V will not glow. Thus by rotating the switch Sr through its several contact positions, the mode with the greatest voltage on its conductor 25, representing the horse most likely to win, will be indicated when the switch is on the contact point of that mode.

To ascertain the horse next most likely to win, the category switches of the mode of the horse which has been found most likely to win, are all opened and the operation of turning the switch Sr through its several positions is repeated. The tube V will glow when the switch Sr contacts the contact point of the mode with the next highest voltage. This operation may be repeated to ascertain the order of likelihood of winning of the other horses to the extent that such information is desired. When all desired information has been obtained all the category switches are opened and the master switch S is turned to the off position.

We claim:

1. In a computer, the combination of: a plurality of voltage summing networks, a source of D.C. voltage connected to said networks, a plurality of diodes each associated with a respective one of said networks and having its anode connected to the summed output of its associated network, a selector switch having contact points connected to the anodes of said diodes respectively, an indicator triode having a fluorescent anode and having its grid connected to the movable arm of said selector switch, a conductor common to the cathodes of said diodes and the cathode of said triode, and a source of operating potential for said triode whereby the fluorescent anode of said triode may be made to fluoresce whenever the potential on said grid is biased by the voltage appearing at a selected one of said anodes of said diodes to permit conduction in said triode.

2. In a computer for relative evaluation of a plurality of entities given characteristics having different evaluation weights, the combination of: a plurality of D.C. voltage sources of different outputs corresponding to and proportional to respective ones of said evaluation weights, a plurality of voltage summing networks each having multiple inputs and a single output, each of said multiple inputs being associated with a respective one of said voltage sources, a plurality of logical gate circuits each corresponding to one of said entities, each logical gate comprising (1) one of said voltage summing networks wherein said multiple inputs comprise a plurality of resistors each having a first value, (2) a resistor having a second value higher than said first value, (3) a conductor common to one terminal of all of said resistors, (4) a plurality of single pole double throw contact switches each having an arm contact connected with the remaining terminal of a respective one of said plurality of first value resistors, the other terminal of said second value resistor being grounded, a first throw contact of each of said switches being connected with a corresponding one of said voltage sources, and the second throw contact of each of said switches being connected to ground, and each logical gate circuit further comprising (5) a diode having its anode connected to said common conductor; a triode indicator tube having an anode which fluoresces during conduction, a D.C. anode supply for said triode, a second conductor common to the cathodes of said diodes and to the negative terminal of said anode supply, a selector switch having a moving arm connected to the grid of said triode, and having a plurality of point contacts each of which is connected to the anode of a respective one of said diodes.

3. The computer defined in claim 2, in which the second common conductor completes a circuit to ground through a resistance of a value up to infinity.

4. In a computer for relative evaluation of a plurality of entities given characteristics having different evaluation weights, the combination of: a plurality of voltage sources of different values each associated with and proportional to a respective one of said evaluation weights, a plurality of summing networks one for each of said entities, said networks having a plurality of separate inputs and outputs, the separate inputs of said networks selectively connectable to respective ones of said voltage sources, an inhibit gate comprising a plurality of diodes, one for each of said entities, the anode of each of said diodes being supplied with the summed voltage from the output of a corresponding one of said networks and the cathodes of all of said diodes being connected in common, an output load resistor connected between said common cathodes and ground, a plurality of switches for each of said characteristics for selectively connecting the inputs of said separate summing networks to said respective voltage sources, and means connected to the anodes of said diodes for indicating which one of said diodes is conducting.

5. The computer defined in claim 4, in which said means for indicating comprises a filamentary, high vacuum, triode having an anode which fluoresces when said triode is conducting, and a selector switch for successively connecting the grid of said triode to the anodes of said diodes.

References Cited in the file of this patent

UNITED STATES PATENTS

| 2,476,747 | Lovell | July 19, 1949 |
| 2,515,888 | Murray | July 18, 1950 |
| 2,950,862 | Bubb | Aug. 30, 1960 |

FOREIGN PATENTS

| 645,367 | Great Britain | Nov. 1, 1950 |

OTHER REFERENCES

"Miniature Rectifier Computing and Controlling Circuits," August 1952, Proceedings of the IRE, pages 931–936. 235–197.

"Electronic Analog Computers," by Korn and Korn, published by McGraw-Hill, 1952 (page 11 relied on).